Patented Sept. 26, 1922.

1,429,932

UNITED STATES PATENT OFFICE.

ALFONS DESCHAUER, OF BONN, GERMANY.

PROCESS FOR THE CHLORINATION OF MONTAN WAX.

No Drawing.   Application filed May 22, 1922.  Serial No. 562,773.

*To all whom it may concern:*

Be it known that I, ALFONS DESCHAUER, a citizen of the Republic of Germany, residing at Bonn-on-the-Rhine, Germany, have invented an Improvement in Processes for the Chlorination of Montan Wax, of which the following description is a specification.

Crude Montan wax has heretofore been useless for a number of technical purposes on account of its dark color and its tendency to brittleness. It has accordingly been the general practice to refine it with nitro-sulphuric acid, a process which to-day has not proved remunerative on account of the enormous cost and the losses attendant on same.

It is now known that by treating the wax with chlorine a number of products may be obtained which can be used for various technical purposes. It has here always been found that the more chlorine the products possess, the harder they continue to grow, assuming more and more the properties of rosin, until finally with 30–60% chlorine contents they resemble fossil rosina such as copals.

The process of the present invention differs completely from other processes now in vogue inasmuch as the chlorination takes place with water. In this case it is most expedient to first dissolve out the Montan wax into fine particles by means of heat. This mixture of floating particles can be chlorinated by passing chlorine gas through the same for a considerable period. It is better still to use nascent chlorine. If Montan wax is mixed in solutions of about 10% caustic soda solution or limewater, thereupon introducing chlorine, preferably until acid reaction sets in, the wax will in a short time change into a light brown waxen substance. The latter can, by washing with water with small addition of alkalis for the purpose of removing mineral acids, be freed of decomposable products to such an extent that it will endure heating up to higher temperatures. The same products can be made by treating hydrochloric acid mixtures with chlorate. Of course, the process can be accelerated by the usual catalysts, ferric chloride, without, however, any particular advantage in the process of manufacture or any change in the qualities of the product.

The consistency of the reaction product depends upon the chlorine contents, in reverse to the previously employed processes above mentioned. With chlorine contents of 8–12% light yellow, hard, somewhat brittle qualities of wax are produced; with 17% the softness is increased, and finally at 28–30% the product assumes a creamy consistency. On account of its light color and indifference to water, chlorized Montan wax offers an excellent substitute for bees' wax, i. e. for insulation purposes, for floor polish, shoe polish etc. By changing the percentage of chlorine contents the product offers numerous possibilities of adaptation to every purpose.

*Example.*

1. 200 grams of Montan wax (crude) are mixed by stirring in a warmed condition with 1200 grams of 10% caustic soda solution. Then, continuing the stirring and heating, chlorin is introduced, until the reaction liquid has turned acid, and until the light yellow reaction product has the desired percentage of chlorine or reaches the desired stage of consistency. In the place of sodium hydroxide other alkaline substances, for instance calcium hydroxide, can also be used.

2. 1½ kilogram of crude Montan wax are heated to melting point in 1500 cb. centimeters of hydrochloric acid with a specific weight of 1, 19 and 4 liters of water, to which 500 grams of chlorate of potash, solid or in liquid solution, are added, the whole being stirred. The light yellow reaction product is washed with water, dried and melted.

I declare that what I claim is as follows:

1. Process for chlorinizing Montan wax, characterized by the fact that the chlorination is effected in aqueous mixtures; substantially as described.

2. Mode of application as in claim 1, characterized by the fact that the chlorination is effected in aqueous mixtures; and by the fact that the chlorination is effected with nascent chlorine; substantially as described.

3. Mode of application as in claim 1, characterized by the fact that the chlorination is effected in aqueous mixtures; and by the fact that the chlorination is effected with chlorine gas with the addition of alkalizing substances; substantially as described.

In testimony whereof, I have signed my name to this specification.

DR. ALFONS DESCHAUER.